(12) United States Patent
Gotman et al.

(10) Patent No.: US 9,137,065 B2
(45) Date of Patent: Sep. 15, 2015

(54) SYSTEMS AND METHODS TO MITIGATE PHASE NOISE

(71) Applicant: QUALCOMM Incorporated, San Diego, CA (US)

(72) Inventors: Maxim Gotman, Hod HaSharon (IL); Ziv Alina, Hod HaSharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/132,637

(22) Filed: Dec. 18, 2013

(65) Prior Publication Data

US 2014/0177765 A1 Jun. 26, 2014

Related U.S. Application Data

(60) Provisional application No. 61/740,318, filed on Dec. 20, 2012.

(51) Int. Cl.
*H04L 27/156* (2006.01)
*H04L 1/00* (2006.01)
*H04L 1/20* (2006.01)

(52) U.S. Cl.
CPC .............. *H04L 27/156* (2013.01); *H04L 1/005* (2013.01); *H04L 1/205* (2013.01)

(58) Field of Classification Search
CPC ... H04L 1/0036; H04L 1/0054; H04L 1/0047; H04L 1/005; H04L 25/03178; H04L 25/03318; H04L 27/2647; H04B 7/0697; H04B 7/0854
USPC ................................. 375/316, 340, 341, 262
See application file for complete search history.

(56) References Cited

U.S. PATENT DOCUMENTS 5,608,763 A * 3/1997 Chiasson et al. ............... 375/332
6,590,945 B1 7/2003 Brardjanian et al.
(Continued)

FOREIGN PATENT DOCUMENTS

WO WO-2007066984 A1 6/2007

OTHER PUBLICATIONS

ISA/EPO, International Search Report and the Written Opinion of the International Searching Authority, Int'l App. No. PCT/US2013/077156, Apr. 25, 2014, European Patent Office, Rijswijk, NL 12 pgs.
(Continued)

*Primary Examiner* — Vineeta Panwalkar
(74) *Attorney, Agent, or Firm* — Holland & Hart LLP

(57) ABSTRACT

Methods, systems, and devices are described for mitigating phase noise. An output of a decoder is utilized to generate an estimation of a plurality of transmitted symbols. One or more phase errors of a plurality of received symbols are generated. The one or more phase errors are based at least in part on the estimation of the plurality of transmitted symbols. The one or more phase errors are generated by comparing angles between the plurality of received symbols and the estimation of the plurality of transmitted symbols. The output of the decoder used to generate the estimation is a plurality of a posteriori log-likelihood ratios (LLRs) of a plurality of transmitted bits. The estimation is generated by performing hard decision decoding on the output of the decoder and remodulating the hard decision decoding according to the modulation used by a transmitter on the plurality of transmitted bits.

18 Claims, 8 Drawing Sheets

(56) References Cited

U.S. PATENT DOCUMENTS

| | | |
|---|---|---|
| 6,968,021 B1 | 11/2005 | White et al. |
| 7,088,793 B1 | 8/2006 | Mickelson et al. |
| 7,173,990 B2 | 2/2007 | Kim et al. |
| 7,203,261 B2 | 4/2007 | Gupta |
| 8,009,772 B1 | 8/2011 | Ormesher et al. |
| 8,036,289 B2 * | 10/2011 | Ryoo et al. .................. 375/260 |
| 2002/0097814 A1 | 7/2002 | Eidson et al. |
| 2002/0186753 A1 | 12/2002 | Kolze |
| 2008/0063121 A1 | 3/2008 | Geller et al. |
| 2008/0069273 A1 | 3/2008 | Geller et al. |
| 2010/0091913 A1 | 4/2010 | Kim et al. |
| 2012/0140796 A1 * | 6/2012 | Dai et al. .................. 375/213 |
| 2012/0159282 A1 * | 6/2012 | Ito .................. 714/758 |
| 2012/0290893 A1 | 11/2012 | Hauske et al. |
| 2013/0243062 A1 | 9/2013 | Raju et al. |

OTHER PUBLICATIONS

ISA/EPO, International Search Report and the Written Opinion of the International Searching Authority, Int'l App. No. PCT/US2013/077156, Dec. 11, 2014, European Patent Office, Rijswijk, NL, 8 pgs.

* cited by examiner

SYSTEMS AND METHODS TO MITIGATE PHASE NOISE

CROSS REFERENCES

The present Application for Patent claims priority to U.S. Provisional Patent Application No. 61/740,318 by Gotman et al., entitled "Systems and Methods to Mitigate Phase Noise," filed Dec. 20, 2012, assigned to the assignee hereof, and expressly incorporated by reference herein.

BACKGROUND

The following relates generally to wireless communication, and more specifically to phase error and correction. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple communication devices. Base stations may communicate with communication devices on downstream and upstream links Each base station has a coverage range, which may be referred to as the coverage area of the cell. A transmitter (e.g., a base station) and a receiver (e.g., a communication device) may include, respectively, components for signal transmissions and signal reception. For example, the transmitter and receiver may each include one or more oscillators. These oscillators may not be in sync with one another, and may have inherent imperfections. As a result, phase noise may be introduced into the received signal. This noise may create difficulties for the receiver to correctly determine the phase for symbols transmitted to the receiver. Currently, phase error is determined by performing hard decisions on the received symbols themselves. However, due to the noisy conditions at the receiver, this hard decision may regularly be incorrect. Thus, the phase error and phase correction generated from this hard decision are also incorrect. Erroneous hard decisions result in the performance degradation of various components in the receiver.

SUMMARY

The described features generally relate to one or more improved systems, methods, and/or apparatuses for generating a phase error and correction for symbols of a signal. An output of a decoder is utilized to generate an estimation of a plurality of transmitted symbols. One or more phase errors of a plurality of received symbols are generated. The one or more phase errors are based at least in part on the estimation of the plurality of transmitted symbols. The one or more phase errors are generated by comparing angles between the plurality of received symbols and the estimation of the plurality of transmitted symbols. The output of the decoder used to generate the estimation is a plurality of a posteriori log-likelihood ratios (LLRs) that represent a plurality of transmitted bits of a codeword. The estimation is generated by performing hard decision decoding and remodulation on the output of the decoder to generate a plurality of received symbols representing the estimation of the plurality of transmitted symbols.

A method to mitigate phase noise is described. An output of a decoder may be utilized to generate an estimation of a plurality of transmitted symbols. One or more phase errors of a plurality of received symbols may be generated. The one or more phase errors may be based at least in part on the estimation of the plurality of transmitted symbols.

Generating the one or more phase errors may include comparing angles between the plurality of received symbols and the estimation of the plurality of transmitted symbols. The one or more phase errors may be based at least in part on the comparison.

In one example, phase corrections may be generated based on the one or more phase errors of the plurality of received symbols. The one or more phase corrections may be applied to the plurality of received symbols to create a plurality of corrected symbols. In one embodiment, a plurality of a priori log-likelihood ratios (LLRs) may be computed using the plurality of phase corrected received symbols. The plurality of LLRs may represent a plurality of bits of a transmitted codeword. The plurality of LLRs may be fed to the decoder to decode the transmitted codeword. A plurality of soft a posteriori LLRs may be collected at the output of the decoder. The soft LLRs may represent the bits of the transmitted codeword. In one example, hard decision decoding and remodulation may be performed on the plurality of soft LLRs to generate a plurality of symbols. The plurality of symbols may represent the estimation of the plurality of transmitted symbols.

The plurality of received symbols may represent a plurality of consecutive, time-interleaved transmitted codewords. The plurality of received symbols may be deinterleaved. In one configuration, a plurality of a priori log-likelihood ratios (LLRs) may be computed from the plurality of received symbols. In addition, the plurality of a priori LLRs may be fed to the decoder. The plurality of received LLRs representing the plurality of transmitted codewords may be decoded. An output of the decoder may be remodulated and interleaved to generate an estimation of a plurality of transmitted symbols of the plurality of transmitted codewords. The estimation may be used to generate the one or more phase errors of each symbol of the plurality of received symbols.

In one embodiment, the plurality of transmitted symbols may represent a transmitted codeword. The plurality of received symbols may represent the transmitted codeword as it was received at the receiver. The plurality of received symbols may be a digitized representation of at least a portion of a wireless communication signal. The decoder may include a forward error correction (FEC) decoder. In one example, the decoder may include a convolutional turbo code (CTC) decoder. The output of the decoder may include a plurality of a posteriori log-likelihood ratios (LLRs) of a plurality of transmitted bits. The plurality of transmitted bits may have been modulated in a transmitter to generate the plurality of transmitted symbols representing the codeword.

In one embodiment, generating the estimation of the plurality of transmitted symbols may include performing hard decision decoding on the output of the decoder, and remodulating the hard decision decoding according to a modulation used by a transmitter on a plurality of transmitted bits. This may generate a plurality of symbols that represent the estimation of the plurality of transmitted symbols.

A receiving device configured to mitigate phase noise is also described. The device may include a processor and memory in electronic communication with the process. Instructions may be stored in the memory. The instructions may be executable by the processor to utilize an output of a decoder to generate an estimation of a plurality of transmitted symbols, and generate one or more phase errors of a plurality of received symbols. The one or more phase errors may be based at least in part on the estimation of the plurality of transmitted symbols.

An apparatus to mitigate phase noise is also described. The apparatus may include means for utilizing an output of a decoder to generate an estimation of a plurality of transmitted symbols, and means for generating one or more phase errors of a plurality of received symbols. The one or more phase errors may be based at least in part on the estimation of the plurality of transmitted symbols.

A computer program product for mitigating phase noise is also described. The computer program product may include a non-transitory computer-readable medium storing instructions executable by a processor to utilize an output of a decoder to generate an estimation of a plurality of transmitted symbols, and generate one or more phase errors of a plurality of received symbols. The one or more phase errors may be based at least in part on the estimation of the plurality of transmitted symbols.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for using the output of a decoder to generate a hypothesis (or estimation) of a plurality of symbols transmitted to a receiving device. The estimation of the symbols may be used as a reference signal.

In one example, the estimation may be fed to a phase detector in a digital phase locked loop (DPLL) along with a plurality of symbols received at the receiving device. The transmitted symbols may represent the received symbols. One or more phase errors of the received symbols may be generated by comparing the angles of the received symbols to the estimation of the transmitted symbols. The generated one or more phase errors may allow phase corrections to be calculated. The one or more phase corrections may be fed back to a rotator that may derotate the plurality of received symbols.

The output of the decoder may include a number of soft a posteriori log-likelihood ratios (LLRs) that represent transmitted bits of a codeword. A hard decision decoding technique and a remodulation process may be performed on the soft LLRs to generate a plurality of symbols representing the estimation of the plurality of transmitted symbols corresponding to the codeword. As previously stated, this estimation may be fed to a phase detector of a DPLL to act as a reference signal to generate one or more phase errors of a plurality of received symbols. As each block of symbols is received by the receiving device, an estimation of the representative transmitted symbols may be generated using soft LLRs and performing a hard decision on the LLRs. The one or more phase errors of the received symbols may then be generated in the phase detector by comparing the angles of the received symbols against the estimation of the representative transmitted symbols. Phase corrections may be generated to correct the one or more phase errors of the plurality of received symbols.

Figure 1:
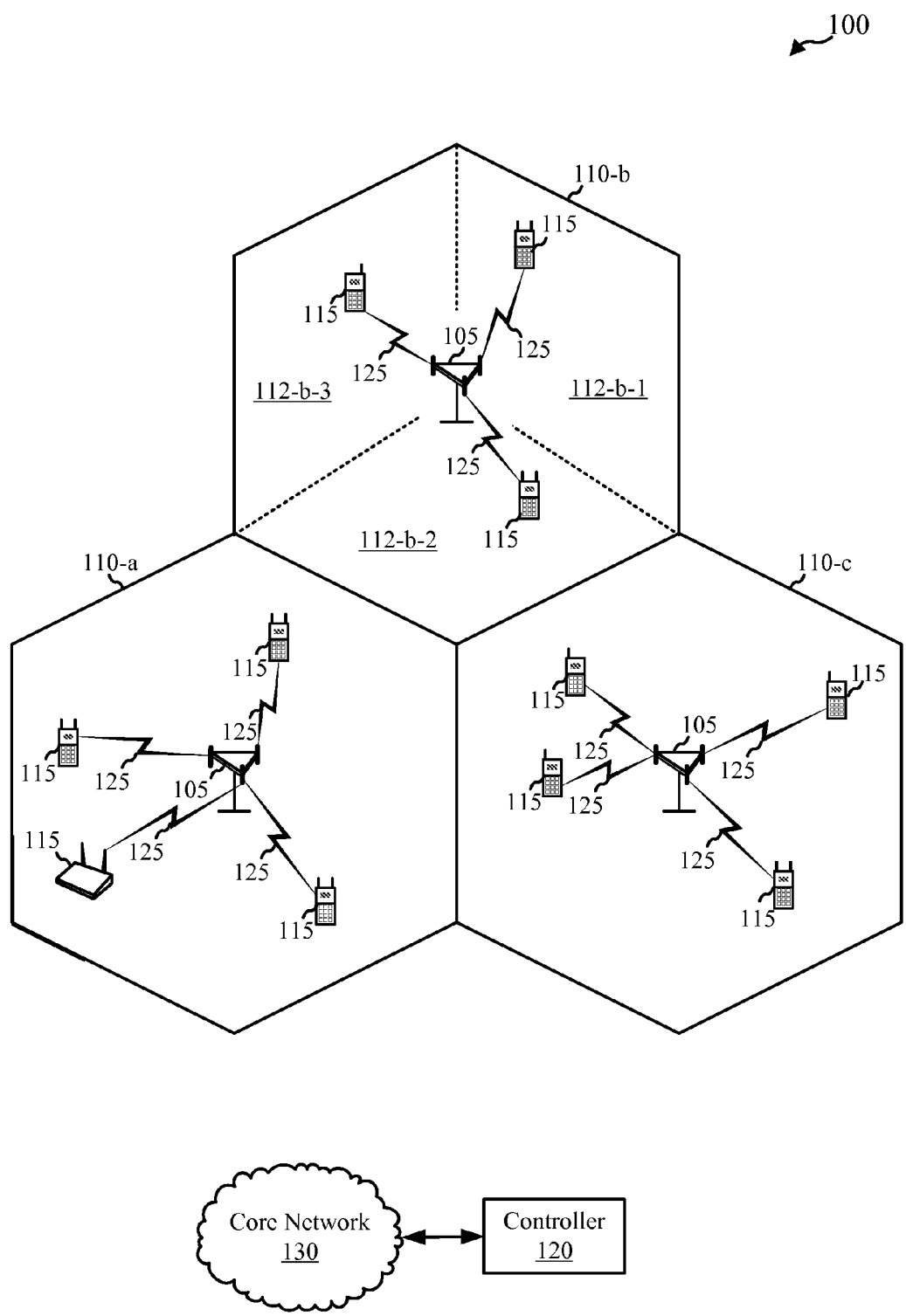
FIG. 1 is a block diagram of an example of a wireless communications system.

Referring first to FIG. 1, a block diagram illustrates an example of a wireless communications system 100. The system 100 includes base stations 105 (or cells), communication devices 115, a base station controller 120, and a core network 130 (the base station controller 120 may be integrated into the core network 130). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources.

The base stations 105 may wirelessly communicate with the devices 115 via a base station antenna (not shown). The base stations 105 may communicate with the devices 115 under the control of the base station controller 120 via multiple carriers. Each of the base station 105 sites may provide communication coverage for a respective geographic area. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area for each base station 105 here is identified as 110-a, 110-b, or 110-c. The coverage area for a base station may be divided into sectors making up only a portion of the coverage area (e.g., sectors 112-b-1, 112-b-2, 112-b-3, etc.). The system 100 may include base stations 105 of different types (e.g., macro, micro, and/or pico base stations). There may be overlapping coverage areas for different technologies. A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations, via link 125. The devices 115 may be referred to as mobile stations, communication devices, access terminals (ATs), user equipments (UEs), subscriber stations (SSs), or subscriber units. The devices 115 may include cellular phones and wireless communications devices, but may also include personal digital assistants (PDAs), other handheld devices, netbooks, notebook computers, tablet computers, etc.

In one example, the base station controller 120 may be coupled to a set of base stations and provide coordination and control for these base stations 105. The base station controller 120 may communicate with the base stations 105 via a backhaul (e.g., core network 130). The base stations 105 may also communicate with one another directly or indirectly and/or via wireless or wireline backhaul.

Various components of the devices 115 may add interference (i.e., noise) to a received signal. For example, phase noise may be introduced by frequency oscillators within the devices 115. A digital phase-locked loop (DPLL) may be used in the modem's receive path of the devices 115 for carrier wave recovery. The DPLL may track the carrier frequency and phase and estimate phase corrections to apply on a plurality of received symbols. The DPLL may be fed with one or more phase errors produced by a phase detector (PD). The one or more phase errors may be produced by comparing the actual phases of a plurality of received symbols with the expected phases of a plurality of ideal reference symbols. In a data aided implementation, where there is no a priori knowledge of the transmitted symbols, the best estimation of the reference symbols is a hard decision taken on the current soft symbols (as a closest constellation point).

Since this part of the modem is susceptive to noisy conditions (both thermal and phase noise), the PD may produce a relatively high rate of erroneous hard decisions yielding degradation in the performance of the PD, which may lead to a decrease in the performance of the DPLL. This may result in the degradation of the overall performance of the modem of a device 115.

The DPLL implemented in the devices 115, in accordance with the present systems and methods, may perform one or more iterations on a plurality of received symbols that represent a transmitted codeword. During a first iteration, each symbol of the plurality of received symbols may be derotated and one or more phase errors may be calculated for each symbol. The one or more phase errors may be based on hard decision decoding performed on the plurality of received symbols themselves. Phase corrections may be computed from the calculated one or more phase errors. The plurality of phase corrected received symbols may be gathered and a plurality of priori log-likelihood ratios (LLRs) may be computed that represent the transmitted bits of the codeword. The plurality of LLRs may be fed to a decoder for a first decoding attempt of the transmitted codeword. The decoder may output a plurality of soft a posteriori LLRs representing the transmitted bits of the codeword. Hard decision decoding and remodulation may be performed on the plurality of soft LLRs. In one configuration, the hard decision decoding and remodulation of the soft LLRs may generate a plurality of received symbols that represent a hypothesis of the plurality of transmitted symbols. The accuracy of the one or more phase errors may increase by generating an estimation of the transmitted symbols and performing an additional iteration of the DPLL on the plurality of received symbols using this remodulated estimation to calculate the one or more phase errors (instead of using the hard decision decoding of the currently received symbols). Phase corrections may then be calculated and applied to the plurality of received symbols to create a plurality of corrected symbols. Thus, the DPLL may be means for generating one or more phase corrections based on the one or more phase errors of the plurality of received symbols, and means for applying the one or more phase corrections to the plurality of received symbols to create a plurality of corrected symbols.

If the transmitted codeword is not decoded correctly during the first iteration, the phase corrected plurality of symbols may again be gathered and a priori LLRs may be generated that represent the bits of the transmitted codeword. The plurality of a priori LLRs may again be fed to the decoder. If the codeword is not decoded correctly, a plurality of soft LLRs may be outputted from the decoder, hard decision and remodulation may be performed to generate a plurality of symbols that represent an estimation of the transmitted symbols and the DPLL may perform another iteration on the plurality of received symbols that represent the transmitted codeword.

When the first codeword is decoded correctly (or when a maximum number of iterations of the DPLL is reached for a particular plurality of received symbols), the DPLL may perform a first iteration on another plurality of received symbols that represent second transmitted codeword. The process then continues to calculate the one or more phase errors for the plurality of symbols that represent the second transmitted codeword. In one example, the state of the DPLL is no reset between successive codewords (e.g., the first and second codewords). In another example, the state of the DPLL may be reset between successive codewords. Thus, the DPLL may be means for utilizing an output of a decoder to generate an estimation of a plurality of transmitted symbols and generating one or more phase errors of a plurality of received symbols, the one or more phase errors based at least in part on the estimation of the plurality of transmitted symbols.

Figure 2:
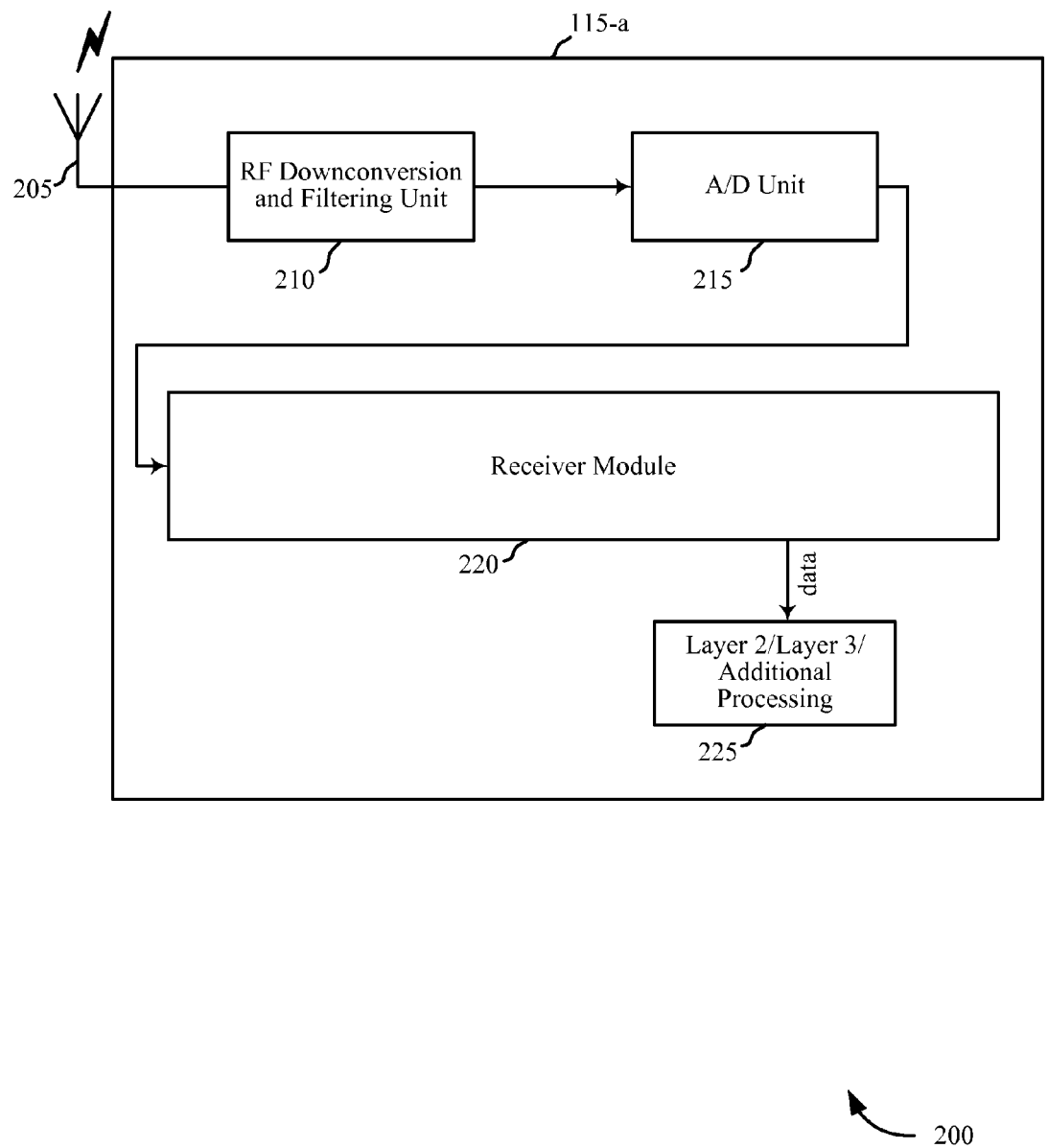
FIG. 2 is a block diagram of a receiver device including components configured according to various embodiments of the invention.

Referring to FIG. 2, an example block diagram 200 of a device 115-a is shown which illustrates various embodiments of the invention. The device 115-a may be an example of a communication device 115 of FIG. 1. In one embodiment, the system at issue may use Quadrature Phase Shift Keying (QPSK). However, the present systems and methods may be implemented using a range of other modulation schemes.

The device 115-a includes a number of receiver components, which may include: a radio frequency (RF) downconversion and filtering unit 210, an analog to digital (A/D) unit 215, and a receiver module 220. These units of the device 115-a may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The device 115-a may include one or more memory units (not shown) used for a variety of purposes.

In one embodiment, a radio frequency signal may be received via an antenna 205. The desired signal is selected and down-converted and filtered through the RF down-conversion and filtering unit 210. The output of that filtering unit 210 is the analog baseband (or passband at much lower frequency than the original radio frequency) signal, which is converted into a digital signal by the A/D unit 215. At the receiver module 220, the digital signal is received and processed to produce a stream of data. The receiver module 220 may also perform the phase error detection and correction techniques according to embodiments of the present systems and methods.

The data stream may be forwarded to a layer 2/layer 3/additional processing unit 225 for further processing. In one embodiment, the components of the receiver module 220 may be implemented in a single PHY chip. In another embodiment, the RF down-conversion and filtering unit 210, A/D unit 215, and components of the receiver module 220 may be implemented in a single chip with RF and PHY functionality. The receiver module 220 may include components to generate phase error and correction of a symbol by performing hard decisions on the output of a decoder, such as a forward error correction (FEC) decoder. The receiver module 220 may also be means for deinterleaving a plurality of received symbols.

Figure 3:
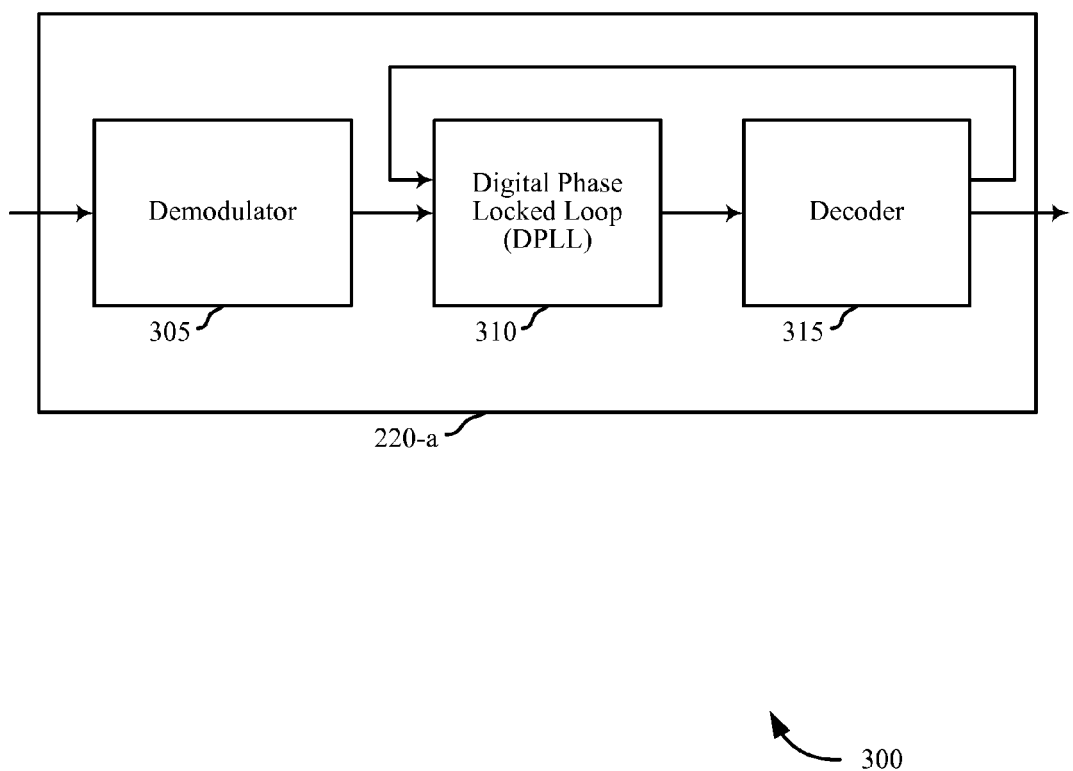
FIG. 3 is a block diagram illustrating one embodiment of a receiver module in accordance with the present systems and methods.

FIG. 3 is a block diagram 300 illustrating one embodiment of a receiver module 220-a, in accordance with the present systems and methods. The receiver module 220-a may be an example of the receiver module 220 show in FIG. 2. The receiver module 220-a may include a demodulator 305, a DPLL 310, and a decoder. As previously explained, the receiver module 220-a may receive a signal that has been converted to a digital signal by the A/D unit 215.

These components of the receiver module 220-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

At the demodulator 305, the digital signal is received and processed to produce a stream of data. The demodulator 305 may perform symbol synchronization, Fast Fourier transform (FFT) processing, frequency offset correction and estimation, and equalizer functions in any variety of combinations known in the art.

The demodulated data (e.g., a plurality of symbols representing a transmitted codeword) may be input to the DPLL 310. The DPLL 310 may determine a phase error of each symbol of the plurality of received symbols. The one or more phase errors may be determined by comparing the angles of the received symbols to an estimation of symbols that were transmitted over the air to the device 115. The calculated one or more phase errors may be used to calculate phase corrections. The one or more phase corrections may correct the one or more phase errors of the symbols of the plurality of received symbols. Thus, the DPLL 310310 may be means for comparing angles between the plurality of received symbols and the estimation of the plurality of transmitted symbols, the one or more phase errors based at least in part on the comparison.

In one example, the DPLL 310 may calculate the one or more phase errors of each symbol of a current block of received symbols. The one or more phase errors may be used to generate one or more phase corrections. The one or more phase corrections may be applied to correct the one or more phase errors. In one embodiment, the phase correction for each symbol may be applied by derotating the corresponding symbol of plurality of symbols according to the rotation value of the symbol's phase correction. Further details regarding the DPLL 310 will be described below.

In one embodiment, a plurality of phase-corrected symbols that represent a single transmitted codeword may be gathered from output of the DPLL 310. A plurality of a priori LLRs may be computed from the plurality of phase-corrected symbols. The a priori LLRs may represent the bits of the transmitted codeword. The plurality of a priori LLRs may be inputted to a decoder 315. The decoder 315 may attempt to decode the codeword that was transmitted over the air to the device 115. The decoded codeword may be provided on a first output of the decoder 315. In addition, the decoder 315 may generate and provide a second output. Thus, the decoder 315 may be means for decoding the plurality of a priori LLRs representing the plurality of transmitted codewords. The second output may include a plurality of a posteriori LLRs (soft LLRs) representing the bits of the transmitted codeword. The soft LLRs may be used to generate a plurality of symbols that represent an estimation of the plurality of transmitted symbols corresponding to the codeword. In one embodiment, symbols may be further processed by other components of the demodulator 305 and/or DPLL 310 before being forwarded to the decoder 315, and in some embodiments the transmitted data need not be encoded so there need not be a decoder 315. Thus, the DPLL 310 may be means for computing a plurality of a priori log-likelihood ratios (LLRs) using the plurality of corrected symbols, the plurality of a priori LLRs representing a plurality of bits of a transmitted codeword and means for feeding the plurality of a priori LLRs to the decoder 315 to decode the transmitted codeword.

In one example, the second output of the decoder 315 may be fed back to an input of the DPLL 310. The second output may be used to generate an estimation of transmitted symbols that were transmitted over the air to the device 115. The DPLL 310 may use the estimation of the transmitted symbols during a second iteration of the plurality of received symbols to generate one or more phase errors of the received symbols. In one configuration, the DPLL 310 may use an estimation of each block of transmitted symbols to determine one or more phase errors of each corresponding block of symbols. Further details regarding the decoder 315 will be described below.

Figure 4:
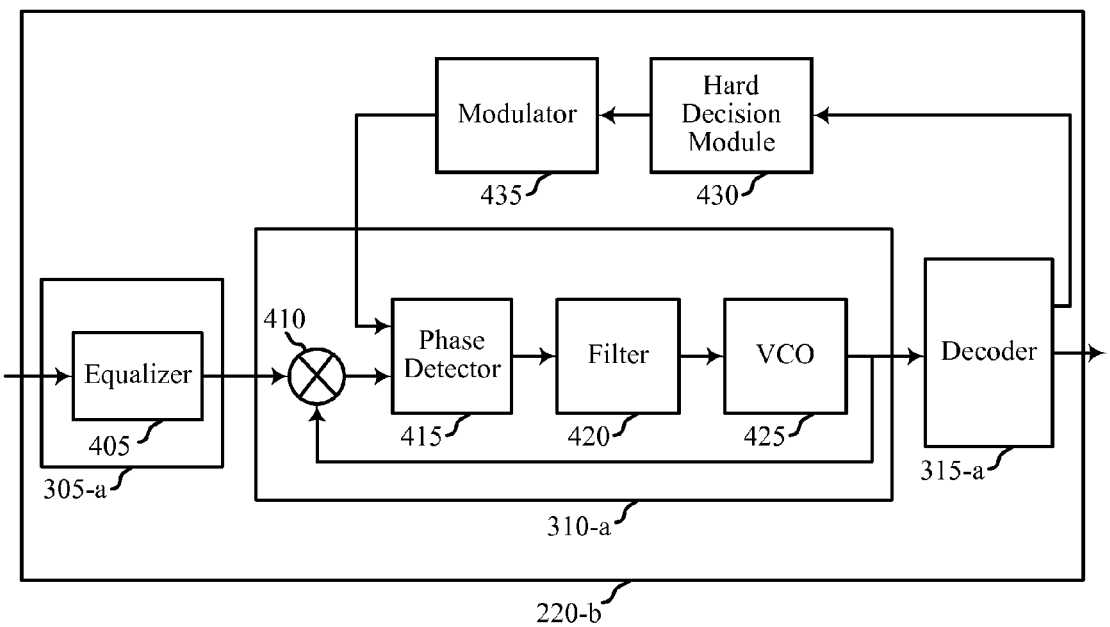
FIG. 4 is a block diagram illustrating a further embodiment of the receiver module that may implement the present systems and methods.

FIG. 4 is a block diagram illustrating one example of a receiver module 220-b that may implement the present systems and methods. In one embodiment, the receiver module 220-b may be an example of the receiver module 220 illustrated in FIGS. 2 and/or 3. The receiver module 220-b may include a demodulator 305-a, a DPLL 310-a, and a decoder 315-a, as previously described. In addition, the receiver module 220-b may include a hard decision module 430 and a modulator 435.

These components of the receiver module 220-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the demodulator 305-a may perform various processes on incoming symbols. For example, the demodulator 305-a may include an equalizer 405 to perform equalization techniques on symbols of a received signal. The output of the equalizer 405 (e.g., equalized symbols) may be input to the DPLL 310-a. While FIG. 4 illustrates the output of the equalizer 405 being fed into the DPLL 310-a, it is to be understood that other implementations may be used. For example, the DPLL 310-a may perform processing on unequalized symbols and the equalizer 405 may be placed after the DPLL 310-a in the chain of components of the receiver module 220-a. The DPLL 310-a may include a rotator 410, a phase detector 415, a filter 420, and a voltage controlled oscillator (VCO) 425. The DPLL 310-a may be a closed-loop frequency-control system based on a phase difference between an input signal and a feedback signal of the VCO 425.

In one configuration, the DPLL 310-a may perform one or more iterations on a plurality of symbols. Each received plurality of symbols may represent a single codeword transmitted to the device 115. The symbols may be constellation points in a QPSK signal that have been rotated according to a random phase caused by the phase noise and frequency offset of one or more oscillators in the communication device 115. In one example, the symbols may be derotated by the rotator 410. The rotator 410 may derotate the symbols according to phase correction values generated by the DPLL 310-a. The one or more phase corrections may be fed back from the VCO 425 to the rotator 410. The derotated symbols may be passed to a phase detector 415. The phase detector (or phase comparator) 415 may be a frequency mixer, analog multiplier, or logic circuit that generates a voltage signal which represents the difference in phase between two signal inputs. For example, the output of the rotator 410 may be a first signal input, while the output of the modulator 435 may be a second signal input. The phase detector 415 may detect the difference in phase and frequency between a reference input (e.g., the second signal input received from the modulator 435) and a feedback input (e.g., the first signal input received from the VCO 425). The phase detector 415 may generate an "up" or "down" control signal based on whether the feedback frequency is lagging or leading the reference frequency. These "up" or "down" control signals may determine whether the VCO 425 needs to operate at a higher or lower frequency, respectively.

The filter 420 may convert these control signals to a control voltage that is used to bias the VCO 425. Based on the control voltage, the VCO 425 oscillates at a higher or lower frequency, which affects the phase and frequency of the feedback from the VCO 425. If the phase detector 415 produces an up signal, then the frequency of the VCO 425 may increase. A down signal decreases the frequency of the VCO 425. The VCO 425 may stabilize once the reference signal and the feedback signal have the same phase and frequency.

The output of the DPLL 310-a, which includes a plurality of phase-corrected (derotated) symbols that represent a transmitted codeword, may be used to generate a plurality of LLRs that represent the bits of the transmitted codeword. This plurality of LLRs may be fed to the decoder 315-a. The decoder 315-a may implement a forward error correction (FEC) scheme to correct errors that may be present in the output from the DPLL 310-a. The decoder 315-a may be a convolutional turbo code (CTC) decoder, a low-density parity-check (LDPC) decoder, and the like.

In one configuration, the decoder 315-a may produce a first output of hard decoded bits with a low bit error rate (BER) due to the coding gain of the decoder 315-a. The decoded bits may correspond to the bits that were modulated at a transmitting device to generate symbols that were transmitted over the air to the communication device 115. In one example, an additional output of the decoder 315-a may include a number of soft a posteriori LLRs which mimic a number of transmitted bits that were modulated in the transmitter device (e.g., the base station 105). The soft LLRs may be hard decoded and remodulated to generate a plurality of symbols that represent the plurality of symbols transmitted over the air to the device 115. As a result, the additional output of the decoder 315-a may include interleaved symbols in a similar sequence that are substantially similar to symbols that were transmitted over the air to the communication device 115.

In one example, the hard decision module 430 may perform hard decision decoding on the second output of the decoder 315-a. A hard decision as used herein may refer to a decision where a signal representative of a received data signal is compared to a single threshold to produce a single bit or symbol output for each of the data bit or symbol values of the received data stream. In one example, the hard decision module 430 may perform hard decision decoding on the soft LLRs outputted from the decoder 315-a. The soft LLRs may also be remodulated by the modulator 435 to generate a hypothesis or estimation of the transmitted symbols. This hypothesis may be fed back to the phase detector 415 as reference symbols. In one configuration, quadrature amplitude modulation (QAM) may be performed on the hard decoded soft LLRs to generate the hypothesis of the symbols that were transmitted over the air. Thus, the hard decision module 430 may be means for performing hard decision decoding and the modulator may be means for remodulation of the plurality of soft a posteriori LLRs to generate a plurality of symbols, the plurality of symbols representing the estimation of the plurality of transmitted symbols. Specifically, the modulator may be means for remodulating and interleaving the output of the decoder to generate the estimation of the plurality of transmitted symbols of the plurality of transmitted codewords. Also, the modulator may be means for remodulating the hard decision decoding according to a modulation used by a transmitter on a plurality of transmitted bits to generate the estimation of the plurality of transmitted symbols.

In one example, the DPLL 310-a may run a second iteration on the plurality of received symbols to determine the one or more phase errors of these symbols based on the estimation of the corresponding transmitted symbols. When the plurality of received symbols are fed to the phase detector 415 during the second iteration, the phase detector 415 may determine the one or more phase errors of the symbols by comparing the angles of the symbols with the angles of the reference symbols received from the feedback loop of the decoder 315-a. The reference symbols may represent an estimation of the symbols that were transmitted over the air to the device 115. Based on the generated one or more phase errors of the received symbols, phase corrections may be generated for the symbols of the plurality of received symbols.

In one configuration, the DPLL 310-a may be combined with a block interleaver. When the interleaver is used, each iteration of the DPLL 310-a and decoder 315 may be performed on a plurality of received symbols that represent multiple transmitted codewords. These multiple codewords may be consecutive, time-interleaved codewords. The block interleaver may deinterleave the plurality of phase-corrected symbols. A plurality of a priori LLRs may be generated and inputted to the decoder 315-a. The LLRs may represent a plurality of bits that represent the multiple codewords transmitted to the device 115. The decoder may generate soft a posteriori LLRs on the plurality of a priori LLRs. The soft LLRs may be remodulated and interleaved to generate a plurality of symbols that represent an estimation of a plurality of transmitted symbols corresponding to the multiple consecutive, time-interleaved codewords. During a second iteration of the DPLL 310-a on the received plurality of symbols, the estimation of the transmitted symbols may be used to generate the phase errors of the received plurality of symbols.

Figure 5:
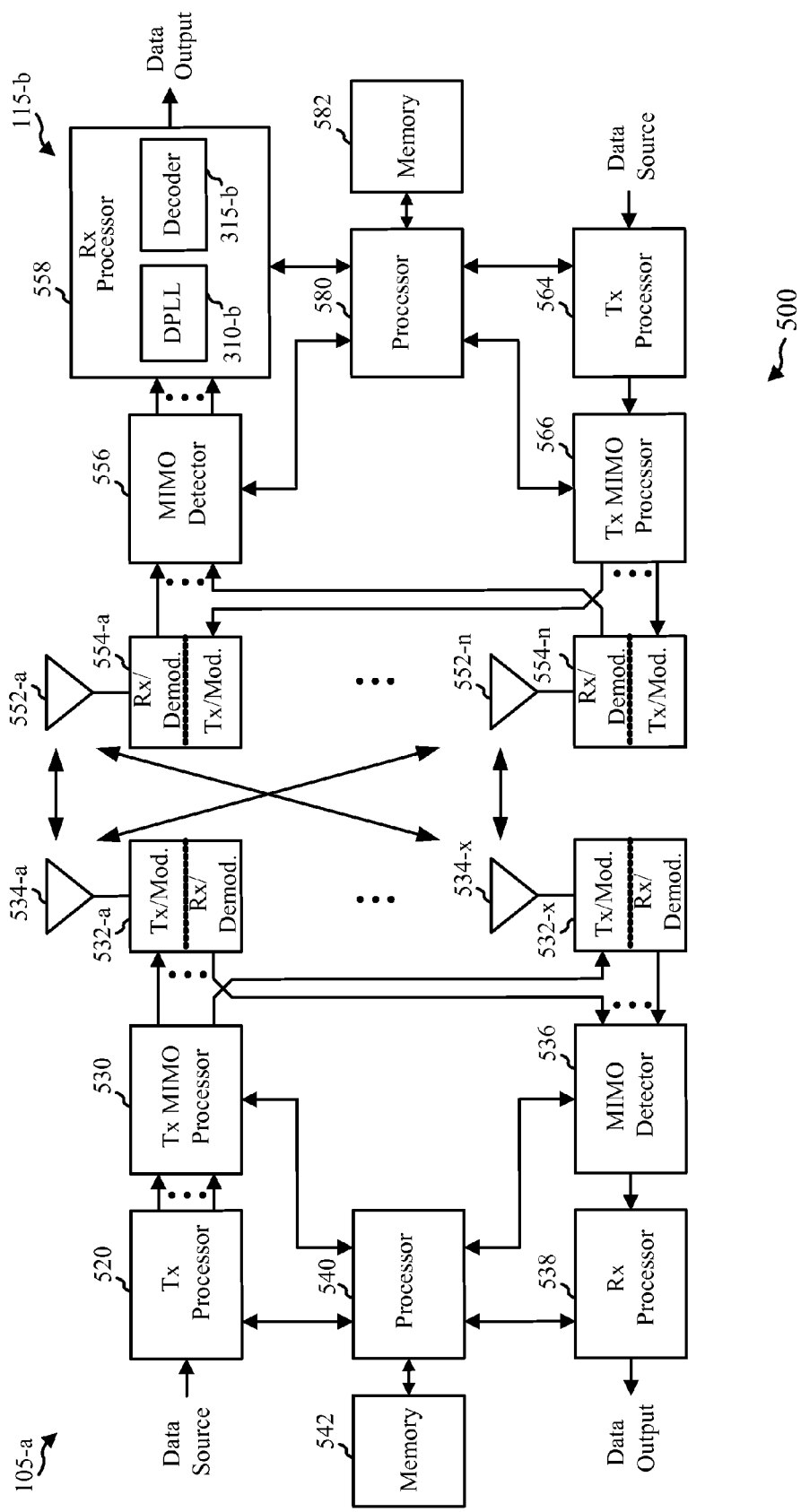
FIG. 5 is a block diagram of an example of a wireless communications system including a base station and a communication device.

FIG. 5 is a block diagram of a system 500 including a base station 105-a and a communication device 115-b. This system 500 may be an example of the system 100 of FIG. 1. The base station 105-a may be equipped with antennas 534-a through 534-x, and the communication device 115-b may be equipped with antennas 552-a through 552-n. At the base station 105-a, a transmit processor 520 may receive data from a data source.

The transmit processor 520 may process the data. The transmit processor 520 may also generate reference symbols, and a cell-specific reference signal. A transmit (TX) MIMO processor 530 may perform spatial processing (e.g., precoding) on data symbols, control symbols, and/or reference symbols, if applicable, and may provide output symbol streams to the transmit modulators 532-a through 532-x. Each modulator 532 may process a respective output symbol stream to obtain an output sample stream. Each modulator 532 may further process (e.g., convert to analog, amplify, filter, and upconvert) the output sample stream to obtain a downlink (DL) signal. In one example, DL signals from modulators 532-a through 532-x may be transmitted via the antennas 534-a through 534-x, respectively.

At the communication device 115-b, the antennas 552-a through 552-n may receive the DL signals from the base station 105-a and may provide the received signals to the demodulators 554-a through 554-n, respectively. Each demodulator 554 may condition (e.g., filter, amplify, downconvert, and digitize) a respective received signal to obtain input samples. Each demodulator 554 may further process the input samples to obtain received symbols. A MIMO detector 556 may obtain received symbols from all the demodulators 554-a through 554-n, perform MIMO detection on the received symbols if applicable, and provide detected symbols. A receive processor 558 may process (e.g., demodulate, deinterleave, and decode) the detected symbols, providing decoded data for the communication device 115-b to a data output, and provide decoded control information to a processor 580, or memory 582.

On the uplink (UL), at the communication device 115-b, a transmit processor 564 may receive and process data from a data source. The transmit processor 564 may also generate reference symbols for a reference signal. The symbols from the transmit processor 564 may be precoded by a transmit MIMO processor 566 if applicable, further processed by the demodulators 554-a through 554-n (e.g., for SC-FDMA, etc.), and be transmitted to the base station 105-a in accordance with the transmission parameters received from the base station 105-a. At the base station 105-a, the UL signals from the communication device 115-b may be received by the antennas 534, processed by the demodulators 554, detected by a MIMO detector 536 if applicable, and further processed by a receive processor. The receive processor 538 may provide decoded data to a data output and to the processor 540. In one configuration, the receive processor 558 may include a DPLL 310-b and a decoder 315-b to implement the systems and methods described herein. The DPLL 310-b and the decoder 315-b may be an examples of the DPLL 310 and decoder 315 described in FIGS. 3 and/or 4. The components of the communication device 115-b may, individually or collectively, be implemented with one or more Application Specific Integrated Circuits (ASICs) adapted to perform some or all of the applicable functions in hardware. Each of the noted modules may be a means for performing one or more functions related to operation of the system 500. Similarly, the components of the base station 105-a may, individually or collectively, be implemented with one or more Application Specific Integrated Circuits (ASICs) adapted to perform some or all of the applicable functions in hardware. Each of the noted components may be a means for performing one or more functions related to operation of the system 500.

Figure 6:
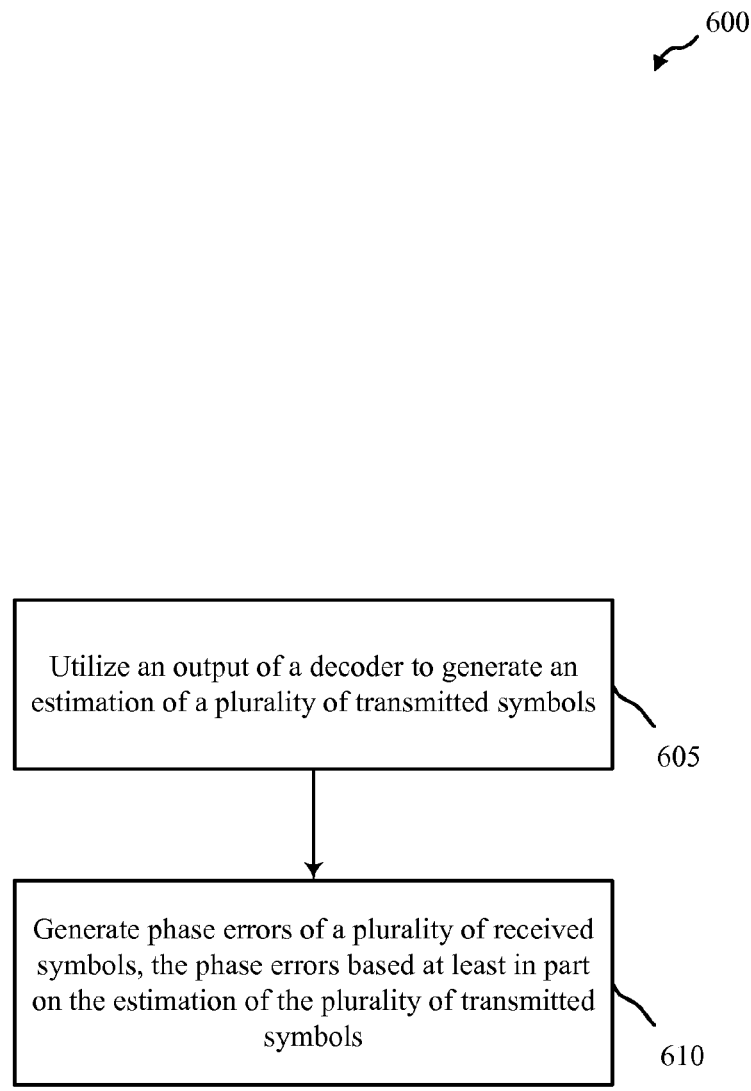
FIG. 6 is a flow chart of a method to generate one or more phase errors in accordance with the present systems and methods.

FIG. 6 is a flow chart illustrating one example of a method 600 to generate one or more phase errors in accordance with the present systems and methods. For clarity, the method 600 is described below with reference to the communication device 115 of FIGS. 1, 2, and/or 5. In one implementation, the receiver module 220 of FIGS. 2, 3, and/or 4 may execute one or more sets of codes to control the functional elements of the communication device 115 to perform the functions described below.

In one configuration, at block 605, an output of a decoder 315 may be utilized to generate an estimation of a plurality of transmitted symbols that represents a first transmitted codeword. The output of the decoder may be a number of a posteriori LLRs of a number of transmitted bits of the first codeword. The transmitted bits may have been modulated in a transmitting device to generate the plurality of transmitted symbols. Hard decision decoding and remodulation may be performed on the output of the decoder to generate a plurality of symbols that represent an estimation of the plurality of transmitted symbols. At block 610, one or more phase errors of a plurality of received symbols may be generated. In one embodiment, the one or more phase errors may be based at least in part on the estimation of the plurality of transmitted symbols. In one example, the one or more phase errors may be generated by comparing angles of the symbols of the plurality of received symbols to the estimation of the plurality of transmitted symbols. The plurality of received symbols may represent the first transmitted codeword.

Therefore, the method 600 may provide for efficient and accurate generation of one or more phase errors for symbols of a signal. It should be noted that the method 600 is just one implementation and that the operations of the method 600 may be rearranged or otherwise modified such that other implementations are possible.

Figure 7:
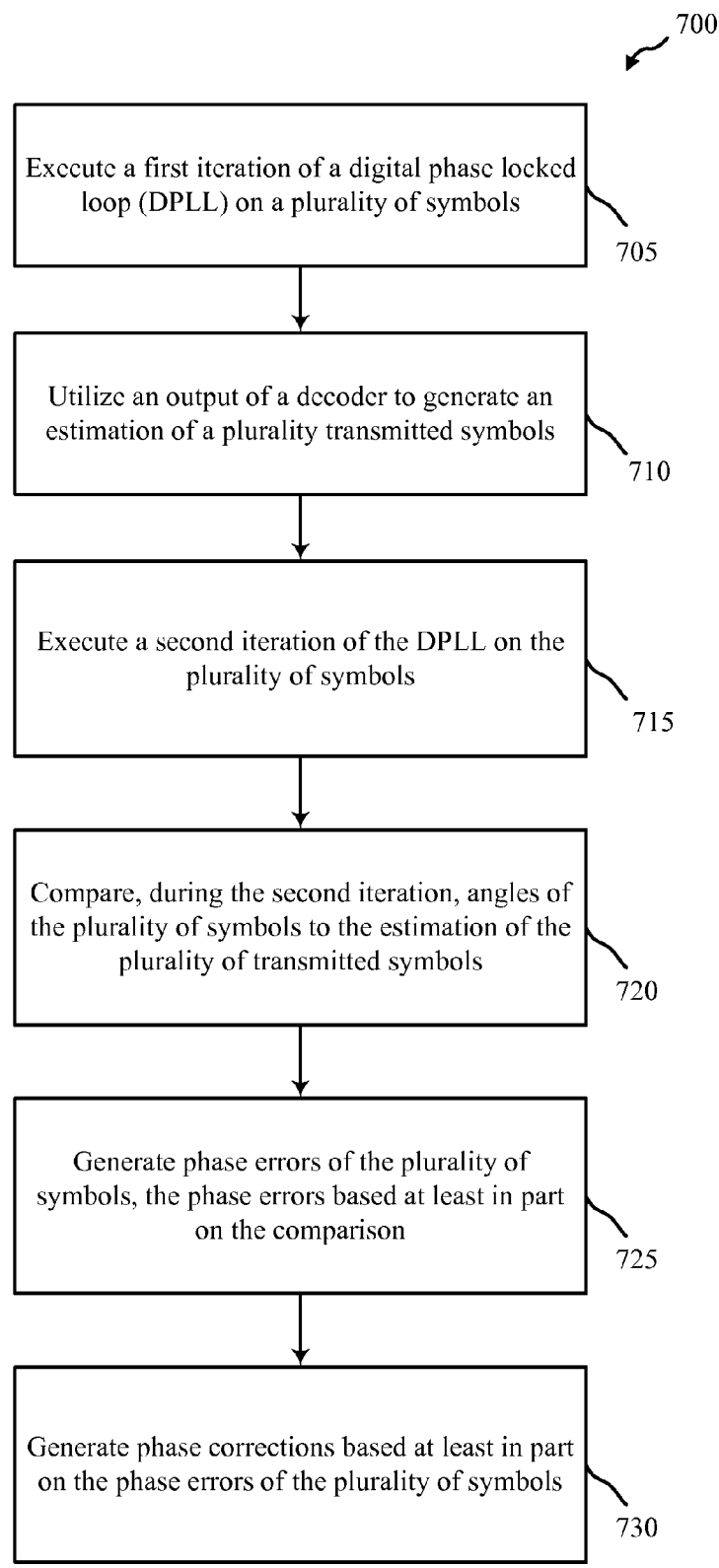
FIG. 7 is a flow chart illustrating one example of a method to perform multiple iterations of a digital phase locked loop (DPLL) on a plurality of symbols of a quadrature phase shift key (QPSK) signal.

FIG. 7 is a flow chart illustrating one example of a method 700 to perform multiple iterations of a DPLL 310 on a block of received symbols of a QPSK signal. For clarity, the method 700 is described below with reference to the communication device 115 of FIGS. 1, 2, and/or 5. In one implementation, the receiver module 220 of FIGS. 2, 3, and/or 4 may execute one or more sets of codes to control the functional elements of the communication device 115 to perform the functions described below.

At block 705, a first iteration of the DPLL 310 may be performed on a plurality of received symbols that represent a first transmitted codeword. During the first iteration, one or more phase errors may be calculated for the symbols based on hard decision decoding of the received symbols themselves.

Phase corrections for the symbols may be generated. The phase-corrected plurality of symbols may be gathered and a priori LLRs may be generated that represent the transmitted bits of the first codeword. The a priori LLRs may be fed to a decoder 315. At block 710, the output of a decoder 315 may be utilized to generate soft LLRs of bits of the first transmitted codeword. The soft LLRs may be hard coded and remodulated to generate a plurality of symbols that represent an estimation of a plurality of transmitted symbols of the first codeword. At block 715, a second iteration of the DPLL 310 may be performed on the plurality of received symbols. At block 720, during the second iteration, angles of the plurality of symbols may be compared to the estimation of the plurality of transmitted symbols. The comparison may be performed to generate, at block 725, one or more phase errors of the symbols of the plurality of received symbols. The one or more phase errors may be based at least in part on the comparison between the angles of the plurality of received symbols (during the second iteration) and the estimation of the plurality of transmitted symbols. In one configuration, at block 730, phase corrections may be generated based at least in part on the generated one or more phase errors. The generated phase corrections may be used to derotate and phase-correct the symbols of the plurality of symbols.

Therefore, the method 700 may provide for efficient and accurate generation of one or more phase errors for a block of symbols by feeding the symbols to the DPLL 310 for multiple iterations and using an estimation of the transmitted symbols to determine the one or more phase errors. It should be noted that the method 700 is just one implementation and that the operations of the method 700 may be rearranged or otherwise modified such that other implementations are possible. For example, while the method 700 describes multiple iterations of the DPLL 310 on the same plurality of symbols, it is to be understood that the DPLL 310 may only perform a single iteration on each plurality of received symbols.

Figure 8:
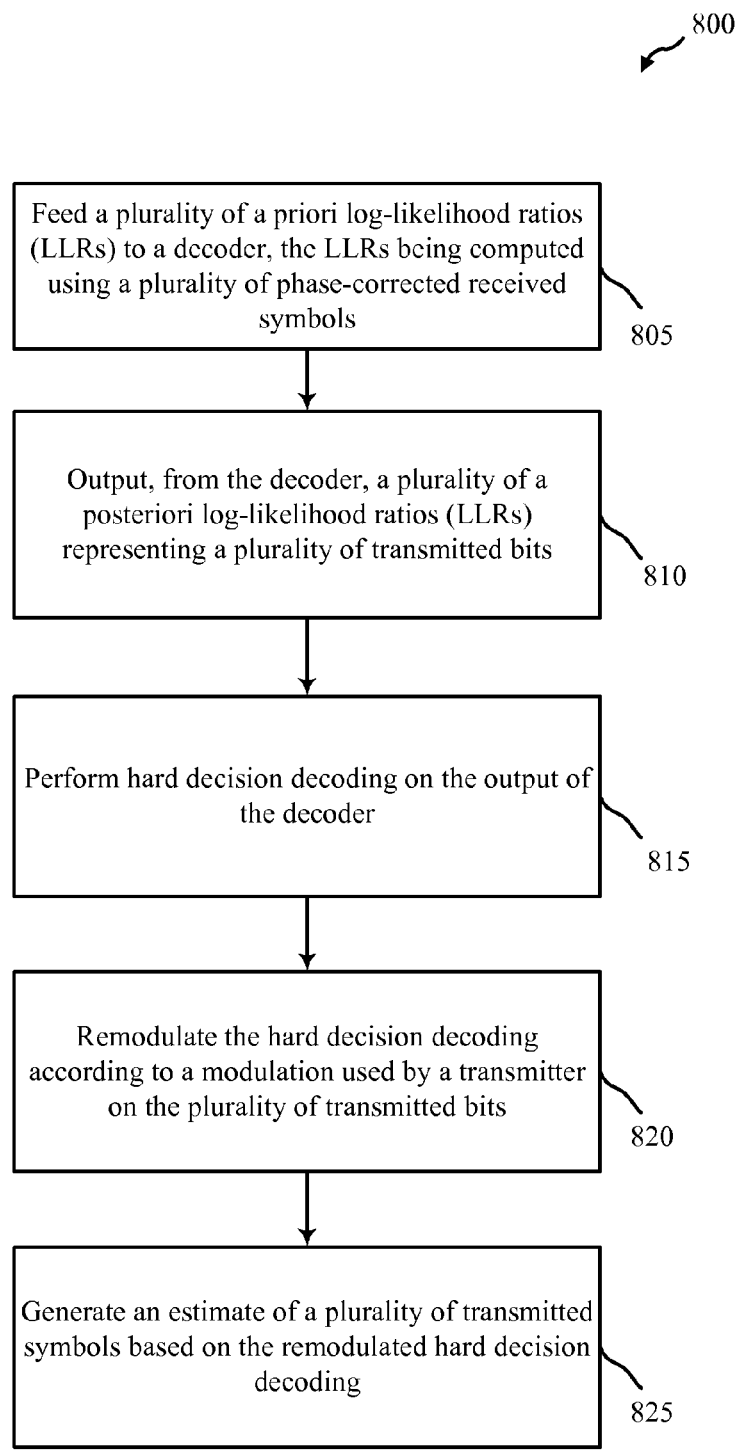
FIG. 8 is a flow chart illustrating one example of a method to generate a hypothesis of a plurality of transmitted symbols by performing hard decision decoding on an output of a decoder, in accordance with the present systems and method.

FIG. 8 is a flow chart illustrating one example of a method 800 to generate a hypothesis of transmitted symbols by performing hard decision decoding on an output of a FEC decoder. For clarity, the method 800 is described below with reference to the communication device 115 of FIGS. 1, 2, and/or 5. In one implementation, the receiver module 220 of FIGS. 2, 3, and/or 4 may execute one or more sets of codes to control the functional elements of the communication device 115 to perform the functions described below.

A plurality of symbols may be received that represent a transmitted codeword. One or more phase errors may be generated for these symbols by performing hard decision decoding on these symbols. Phase corrections may be calculated for the one or more phase errors. The phases of the plurality of received symbols may be corrected according to the calculated phase corrections. At block 805, a plurality of a priori LLRs of the phase-corrected symbols may be fed from a DPLL 310 to a decoder 315. At block 810, a plurality of a posteriori LLRs (soft LLRs) may be generated at the output of the decoder 315. The soft LLRs may be for a plurality of transmitted bits of a codeword that were modulated at a transmitting device into a plurality of symbols and transmitted over the air to the communication device 115. At block 815, hard decision decoding may be performed on the output of the decoder 315. At block 820, results of the hard decision decoding may be remodulated according to a modulation scheme used by the transmitting device on the plurality of transmitted bits. The hard decoding and remodulation of the soft LLRs may generate a plurality of symbols that represent a plurality of transmitted symbols of the codeword. In one configuration, at block 825, the estimate of the symbols transmitted over the air may be generated. The estimation may be based on the remodulated hard decision decoding. The estimation may be fed to a phase detection of the dpll 310 to serve as a reference signal. The phase detector 415 may determine the one or more phase errors of a plurality of received symbols representing the received codeword using the estimation of the transmitted symbols instead of the hard decision decoding on the received symbols themselves.

Therefore, the method 900 may provide for generation of an estimation of symbols transmitted over the air to the communication device 115 by performing hard decision decoding and remodulation on soft LLRs of the transmitted bits generated at the output of an FEC decoder. It should be noted that the method 900 is just one implementation and that the operations of the method 900 may be rearranged or otherwise modified such that other implementations are possible.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing FDMA and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The description provided above provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques.

These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method to mitigate phase noise, comprising:
   generating a plurality of a priori log-likelihood ratios (LLRs) using a plurality of corrected symbols, the plurality of a priori LLRs representing a plurality of bits of a transmitted codeword;
   providing the plurality of a priori LLRs to a decoder;
   performing a hard decision decoding on an output of the decoder;
   remodulating an output of the hard decision decoding according to a modulation used by a transmitter on a plurality of transmitted bits to generate an estimation of a plurality of transmitted symbols; and
   generating one or more phase errors of a plurality of received symbols, the one or more phase errors based at least in part on the estimation of the plurality of transmitted symbols.

2. The method of claim 1, wherein generating the one or more phase errors comprises:
   comparing angles between the plurality of received symbols and the estimation of the plurality of transmitted symbols, the one or more phase errors based at least in part on the comparison.

3. The method of claim 1, further comprising:
   creating the plurality of corrected symbols by generating one or more phase corrections based on the one or more phase errors of the plurality of received symbols; and
   applying the one or more phase corrections to the plurality of received symbols to create the plurality of corrected symbols.

4. The method of claim 1, further comprising:
   collecting a plurality of soft a posteriori LLRs at the output of the decoder, the soft a posteriori LLRs representing the plurality of bits of the transmitted codeword.

5. The method of claim 1, further comprising:
   deinterleaving the plurality of corrected symbols, wherein the plurality of corrected symbols represent a plurality of consecutive, time-interleaved transmitted codewords.

6. The method of claim 1, wherein the output of the decoder comprises a plurality of a posteriori log-likelihood ratios (LLRs) of the plurality of transmitted bits, the plurality of transmitted bits being modulated in the transmitter to generate the plurality of transmitted symbols.

7. A receiving device configured to mitigate phase noise, comprising:
- a processor;
- memory in electronic communication with the processor; and
- instructions stored in the memory, the instructions being executable by the processor to:
    - generate a plurality of a priori log-likelihood ratios (LLR) using a plurality of corrected symbols, the plurality of a priori LLRs representing a plurality of bits of a transmitted codeword;
    - provide the plurality of a priori LLRs to a decoder;
    - perform a hard decision decoding on an output of the decoder;
    - remodulate an output of the hard decision decoding according to a modulation used by a transmitter on a plurality of transmitted bits to generate an estimation of a plurality of transmitted symbols; and
    - generate one or more phase errors of a plurality of received symbols, the one or more phase errors based at least in part on the estimation of the plurality of transmitted symbols.

8. The receiving device of claim 7, wherein the instructions to generate the one or more phase errors are executable by the processor to:
- compare angles between the plurality of received symbols and the estimation of the plurality of transmitted symbols, the one or more phase errors based at least in part on the comparison.

9. The receiving device of claim 7, wherein the instructions are executable by the processor to:
- create the plurality of corrected symbols by generating one or more phase corrections based on the one or more phase errors of the plurality of received symbols, and applying the one or more phase corrections to the plurality of received symbols to create the plurality of corrected symbols.

10. The receiving device of claim 7, wherein the instructions are executable by the processor to:
- collect a plurality of soft a posteriori LLRs at the output of the decoder, the soft a posteriori LLRs representing the plurality of bits of the transmitted codeword.

11. The receiving device of claim 7, wherein the instructions are executable by the processor to:
- deinterleave the plurality of corrected symbols, wherein the plurality of corrected symbols represent a plurality of consecutive, time-interleaved transmitted codewords.

12. The receiving device of claim 7, wherein the output of the decoder comprises a plurality of a posteriori log-likelihood ratios (LLRs) of the plurality of transmitted bits, the plurality of transmitted bits being modulated in the transmitter to generate the plurality of transmitted symbols.

13. An apparatus to mitigate phase noise, comprising:
- means for generating a plurality of a priori log-likelihood ratios (LLR) using a plurality of corrected symbols, the plurality of a priori LLRs representing a plurality of bits of a transmitted codeword;
- means for providing the plurality of a priori LLRs to a decoder;
- means for performing a hard decision decoding on an output of the decoder;
- means for remodulating an output of the hard decision decoding according to a modulation used by a transmitter on a plurality of transmitted bits to generate an estimation of a plurality of transmitted symbols; and
- means for generating one or more phase errors of a plurality of received symbols, the one or more phase errors based at least in part on the estimation of the plurality of transmitted symbols.

14. The apparatus of claim 13, further comprising:
- means for comparing angles between the plurality of received symbols and the estimation of the plurality of transmitted symbols, the one or more phase errors based at least in part on the comparison.

15. The apparatus of claim 13, further comprising:
- means for creating the plurality of corrected symbols by generating one or more phase corrections based on the one or more phase errors of the plurality of received symbols, and applying the one or more phase corrections to the plurality of received symbols to create the plurality of corrected symbols.

16. The apparatus of claim 13, wherein the means for the generating one or more phase errors comprises:
- means for collecting a plurality of soft a posteriori LLRs at the output of the decoder, the soft a posteriori LLRs representing the plurality of bits of the transmitted codeword.

17. The apparatus of claim 13, further comprising:
- means for deinterleaving the plurality of corrected symbols, wherein the plurality of corrected symbols represent a plurality of consecutive time-interleaved transmitted codewords.

18. A computer program product for mitigating phase noise, the computer program product comprising a non-transitory computer-readable medium storing instructions executable by a processor to:
- generate a plurality of a priori log-likelihood ratios (LLR) using a plurality of corrected symbols, the plurality of a priori LLRs representing a plurality of bits of a transmitted codeword;
- provide the plurality of a priori LLRs to a decoder;
- perform a hard decision decoding on an output of the decoder;
- remodulate an output of the hard decision decoding according to a modulation used by a transmitter on a plurality of transmitted bits to generate an estimation of a plurality of transmitted symbols; and
- generate one or more phase errors of a plurality of received symbols, the one or more phase errors based at least in part on the estimation of the plurality of transmitted symbols.

* * * * *